United States Patent [19]
Johnson et al.

[11] Patent Number: 4,776,691

[45] Date of Patent: Oct. 11, 1988

[54] COMBINATION LASER DESIGNATOR AND BORESIGHTER SYSTEM FOR A HIGH-ENERGY LASER

[75] Inventors: William M. Johnson, Sudbury; Lewis R. Andrews, Beverly; Edward Bernardon, Cambridge, all of Mass.

[73] Assignee: The Charles Stark Draper Laboratory, Inc., Cambridge, Mass.

[21] Appl. No.: 791,757

[22] Filed: Oct. 28, 1985

[51] Int. Cl.⁴ .................. G01B 11/26; H01S 3/00
[52] U.S. Cl. .................. 356/152; 244/3.16; 330/4.3
[58] Field of Search .................. 89/41.05, 41.06; 244/3.13, 3.16; 250/332, 342; 358/109, 113; 330/4.3; 356/152

[56] References Cited

U.S. PATENT DOCUMENTS

| | | | |
|---|---|---|---|
| 3,942,127 | 3/1976 | Fluhr | 330/4.3 |
| 4,144,505 | 3/1979 | Angelbeck et al. | 356/152 |
| 4,146,329 | 3/1979 | King et al. | 356/152 |
| 4,384,198 | 5/1983 | Williamson | 356/152 |
| 4,385,834 | 5/1983 | Maxwell | 356/153 |
| 4,614,913 | 9/1986 | Honeycutt et al. | 330/4.3 |

Primary Examiner—Stephen C. Buczinski
Attorney, Agent, or Firm—Weingarten, Schurgin, Gagnebin & Hayes

[57] ABSTRACT

Means including a single comparatively low-power laser and cooperative optics are disclosed for both designating and boresighting a comparatively high-power laser with an intended target object.

10 Claims, 3 Drawing Sheets

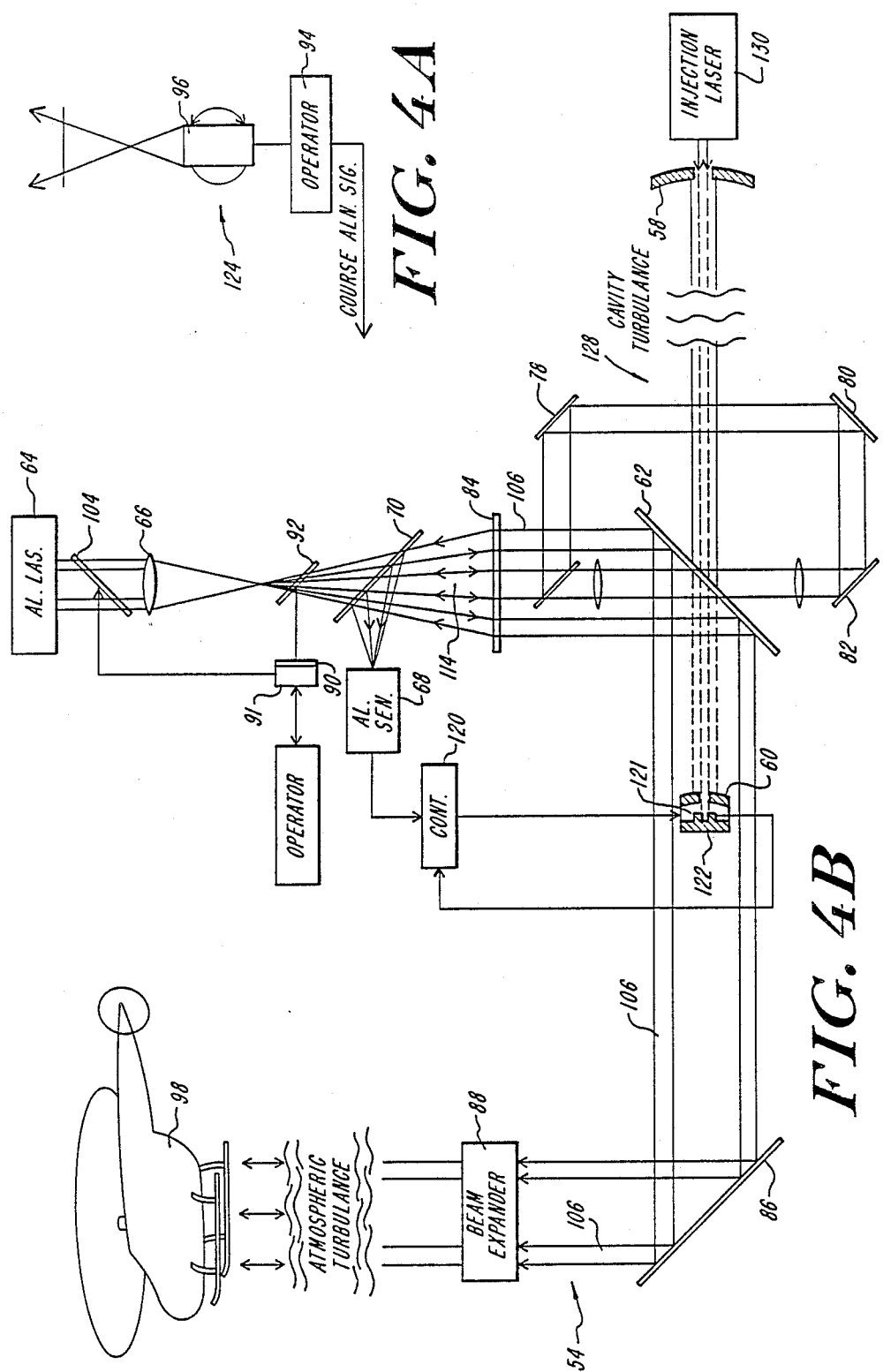

COMBINATION LASER DESIGNATOR AND BORESIGHTER SYSTEM FOR A HIGH-ENERGY LASER

FIELD OF THE INVENTION

This invention is directed to the field of optics, and more particularly, to a novel combination laser designator and boresighter system for a high-energy laser.

BACKGROUND OF THE INVENTION

In many applications including high-energy tactical weaponry, a high-energy laser system is called upon to direct outgoing pulses of high-energy laser light on-target and in-focus to a targeted object. In the tactical weapon scenario where a laser tank is hunting for flying enemy helicopters, the coordinates of a possible helicopter are acquired by a tactical radar or other wide field-of-view tracking system typically envisioned to be separate from, but in communication with, the laser tank. After target acquisition, the operator of the tracking system would then put a low-energy laser designator spot on the target and thereafter hand-over the coordinates of the acquired and thus designated target to the laser tank vehicle. The operator of the laser tank would then sight the designator spot as an aimpoint reference for directing outgoing pulses of high-energy laser light onto the target.

The designator beam and the outgoing high-energy beam, however, must traverse different optical paths from the several vehicles. The differing atmospheric turbulence, blooming, diffraction and other states thereby introduced along the two different propagation paths effect mis-targeted outgoing pulses of high-energy laser light. In addition, the two separate sub-systems andd considerably to the complexity of the overall system design and to its final cost. Moreover, the laser tank vehicle is called upon to image the whole of the targeted object to locate the designator spot, which thereby limits the utility of the overall system by increasing the system response time in proportion to the time required for processing the whole of the image to locate the designated region thereof.

SUMMARY OF THE INVENTION

The novel combination laser designator and boresighter system for a highenergy laser of the present invention overcomes these and other disadvantages by providing both laser designation of an intended aimpoint and laser boresighting of the targeted object along the same optical path in a single system. Any adverse atmospheric turbulence and other effects that may be present along the same propagation path are self-compensating, due to the phenomena of propagation reciprocity, and relative boresighting and designator inaccuracies thereby are substantially eliminated. The combination system of the invention significantly reduces overall system cost and complexity, and system response time in determining an intended aimpoint is significantly enhanced.

In general terms, the present invention is based in the recognition that an alignment laser sub-system of a high-energy laser for providing boresighting of the outgoing pulses of high-energy laser light can as well advantageously function as a designator spot source. The system of the invention thereby makes possible target designation and boresight alignment of the outgoing pulses of high-energy laser light with the designator spot along the same optical path, and therewith wholly eliminates the need for a separate designator laser subsystem with all its attendant disadvantages.

The target and the designator spot are imaged on an imaging sensor, and an operator selectively moves a designator cursor on the imaging sensor for selectively placing the designator spot on an intended target aimpoint. Since the cavity and designator spot beam have a common optical path, the sensor image need then only be processed in and around the general neighborhood of the designator spot, which therewith provides a significant improvement in the overall system response time.

In one embodiment, the optical cavity of the high-energy laser is operative as a confocal unstable laser resonator. In another embodiment, an injection laser is coupled to a cavity that is operative as a master oscillator power amplifier. In both embodiments, a combination designator and alignment laser and cooperative optics provide an operator viewable sensor with an image of the targeted object and with an image of the designated aimpoint in real-time. An alignment sensor and cooperative optics provide images representative of the cavity pointing direction on an alignment sensor. A controller is responsive to the several sensor images and to the position of the operator aimpoint cursor to automatically boresight the outgoing pulses of high-energy laser light on-target and in-focus onto the intended target aimpoint.

BRIEF DESCRIPTION OF THE DRAWINGS

These and other features and attendant advantages of the present invention will become apparent as the invention becomes better understood by referring to the following solely exemplary and non-limiting detailed description of the preferred embodiments thereof, and to the drawings, wherein:

FIG. 4 is a schematic diagram illustrating in FIGS. 4A and 4B thereof another embodiment of the combination laser designator and boresighter system for a high-energy laser according to the present invention;

FIG. 5 is a pictorial plan diagram of the imaging sensor useful in explaining the operation of the combination laser designator and boresighter system for a high-energy laser according to the present invention; and FIG. 6 is a pictorial plan diagram of the alignment sensor useful in further explaining the operation of the combination laser designator and boresighter system for a high-energy laser according to the present invention.

DETAILED DESCRIPTION OF THE PREFERRED EMBODIMENTS

Figure 1:
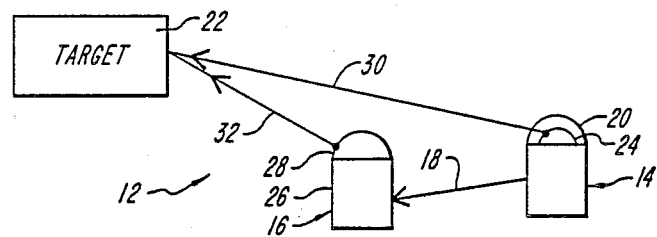
FIG. 1 is a pictorial view useful in explaining the operation of a prior art laser designator and cooperative separate laser boresighter for a high-energy laser.

Referring now to FIG. 1, generally designated at 12 is a pictorial diagram useful in explaining the operation of a prior art laser designator and a cooperative, separate laser boresighter for a high-energy laser. The system 12 includes a target acquisition and designation sub-system generally designated 14 connected to a high-energy laser system generally designated 16 via a communications link 18. The sub-system 14 includes a wide field-of-view tracker 20 such as a radar or an optical telescope operative in well-known manner to scan the sky for the presence of a target 22 therein, such as an enemy helicopter. After the target 22 is acquired by the tracker 20, the system 14 is operative to designate it by putting a comparatively low-power spot thereon as by a designator laser 24. The space-time coordinates of the target 22 as acquired by the tracker 20 and as designated by the designator laser 24 are then handed-over to a course acquisition controller 26 of the high-energy laser system 16. The system 16 includes a high-energy laser 28, and the controller 26 is operative to lock the high-energy laser 28 into the spacetime coordinates of the target 22. The high-energy laser 28 then directs a high-energy laser beam at an intended aimpoint on the targeted object 22.

The system 12 is disadvantageous insofar as in its requirement for separate sub-systems 14, 16 to severally provide the designator and energy dump functions, it considerably adds to the complexity and cost of the overall system. The spacial separation of the sub-systems 14, 16, moreover, causes the designator and high-energy laser beams to traverse different optical paths 30, 32 through the atmospheric medium between the target and the respective sub-systems 14, 16. As will be appreciated, since the different beams along the respective paths 30, 32 encounter different atmospheric conditions, the beams are deviated thereby in respectively different ways which makes boresighting and target designation both inexact and time consuming processes.

Figure 2:
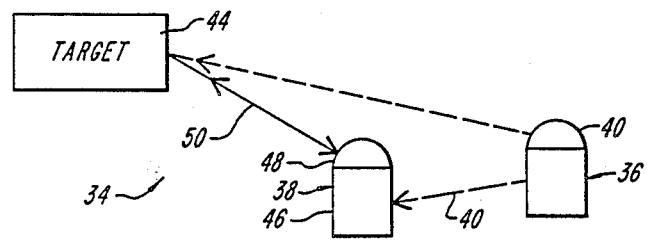
FIG. 2 is a pictorial diagram useful in explaining the operation of the combination laser designator and boresighter system for a high-energy laser according to the present invention.

Referring now to FIG. 2, generally designated at 34 is a pictorial diagram useful in explaining the operation of the combination laser designator and boresighter system for a high-energy laser according to the present invention. The system 34 preferably includes a tracker generally disgnated 36 coupled to a highenergy laser system generally designated 38 via a communication link illustrated dashed at 40. Although the tracker 36 is shown separate from the sub-system 38, it could be advantageously combined therewith in a single vehicle or system without departing from the inventive concept.

The tracker 36 includes a radar 42 or other wide field-of-view system 42 for acquiring a target 44 which may again be an enemy helicopter. After target acquisition, the system 36 hands-over the coordinates of the target 44 over the link 40 to a course controller 46 of the high-energy laser 38 and to which a combination high-energy laser designator and boresightor 48 to be described is mounted. After rough target hand-over and lock-on, the system 48 is operative to put a designator spot on the target 44, and is thereafer operative to repetitively produce outgoing pulses of high-energy light along the same optical path as that traversed by the designator laser as schematically illustrated by the multiple-headed arrow 50. As will readily be appreciated, because the designator laser and the high-energy laser pulses both traverse the same optical path, any atmospheric-induced distortions and other effects are self-compensating, due to the phenomenon of propagation reciprocity.

Figure 3A:
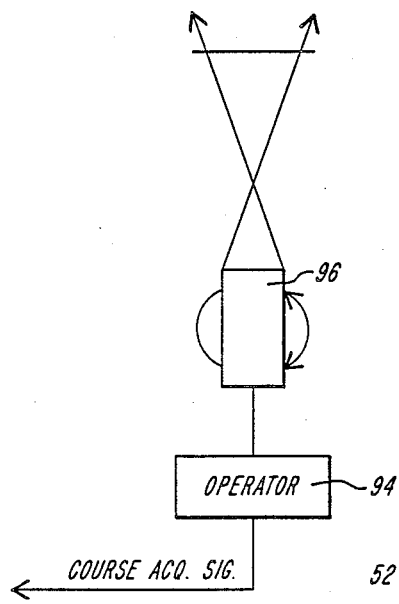
FIG. 3 is a schematic diagram illustrating in FIGS. 3A and 3B thereof one embodiment of the combination laser designator and boresighter system for a high-energy laser according to the present invention.
Figure 3B:
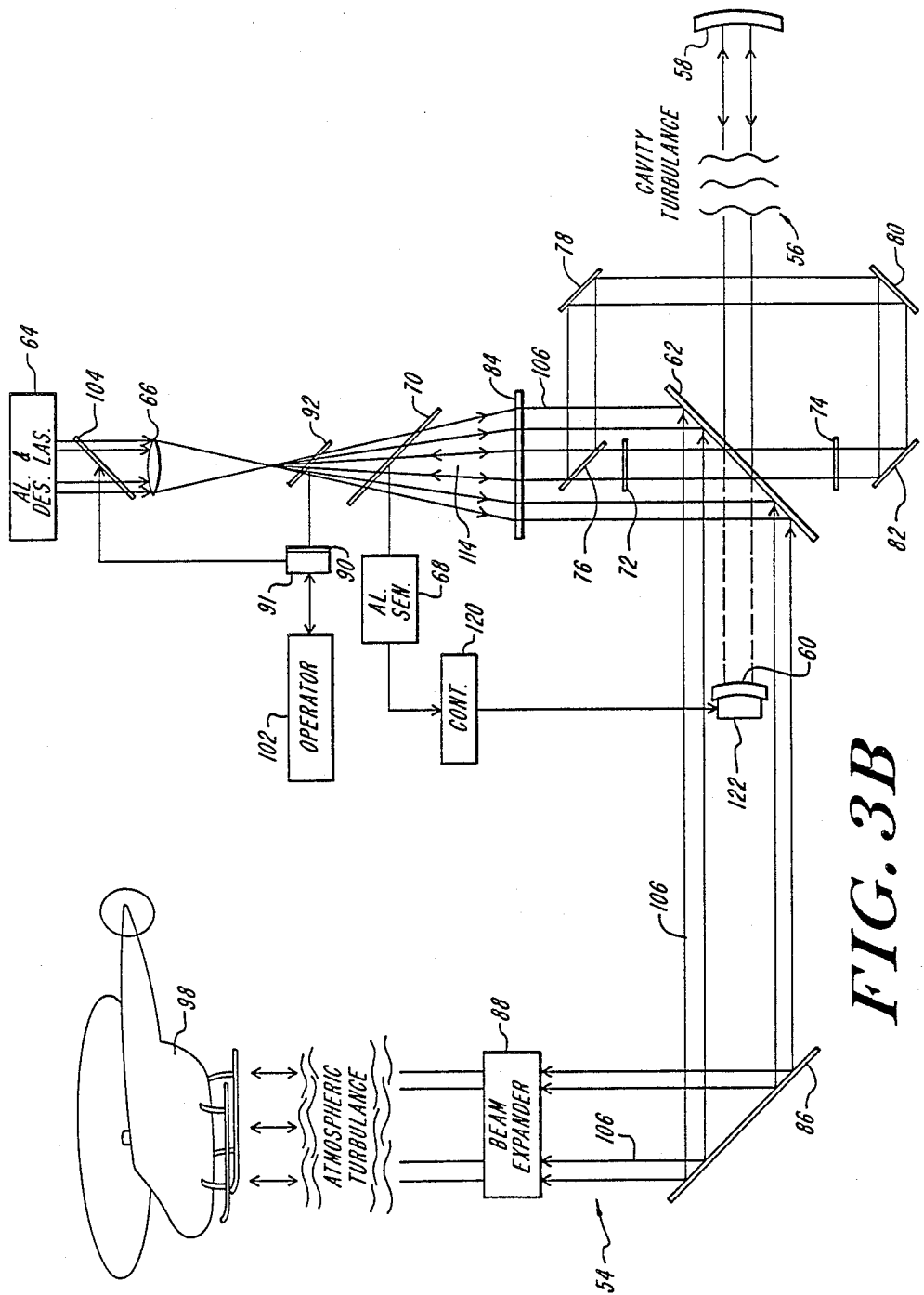

Referring now to FIG. 3, generally designated at 52 in FIG. 3A is a schematic diagram illustrating the tracker vehicle and generally designated at 54 in FIG. 3B is the combination high-energy laser designator and boresighter system according to the present invention. The system 54 includes a confocal unstable laser resonator cavity generally designated 56 having a concave primary reflector schematically illustrated by vertical member 58, and having a convex secondary reflector schematically illustrated by vertical member 60 spaced from the concave reflector 58 with their respective focal points disposed about a common point, not shown. An apertured spinning mirror schematically illustrated at 62 having specular surfaces on each side thereof is disposed intermediate the cavity mirrors 58, 60 of the confocal unstable laser resonator 56. Reference may be had to co-pending U.S. utility patent application Ser. No. 512,153, now U.S. Pat. No. 4,684,796, entitled COMMON OPTICAL APERTURE LASER SEPARATOR FOR RECIPROCAL PATH OPTICAL SYSTEMS invented by William M. Johnson and assigned to the same assignee as the instant invention, incorporated herein by reference, for a further description of the laser separator therein shown, described, and claimed.

A combination alignment and designator laser 64 designated "AL. & DES. LAS" is positioned confronting one specular surface of the spinning mirror 62. A focusing lens 66 is positioned along the optical path of the laser 64, and an alignment sensor 68 is positioned off the optical axis of the laser 64 via a beam splitter 70.

A converging lens schematically illustrated at 72 is positioned along the optical path of the laser 64 and confronting one surface of the apertured spinning disk 62, and a diverging lens schematically illustrated at 74 is positioned along the optical path of the laser 64 and confronting the other specular surface of the apertured spinning disk 62. A beam splitter 76 is positioned along the optical path of the alignment laser and intermediate one reflecting surface of the spinning mirror 62 and the alignment laser 64, and light deviating mirrors 78, 80, and 82 are positioned along the optical path of one leg of the beam splitter 76 for deviating light onto and off of the other surface of the spinning mirror 62. An imaging lens 84 is provided along the optical path of the laser 64.

A pointing mirror 86 is provided confronting the spinning mirror 62, and a beam expander 88 of well-known design is provided confronting the pointing mirror 86.

An imaging sensor 90 is coupled to receive energy off the optical path of the laser 64 via a beam splitter 92.

In operation, an operator 94 in FIG. 3A and positioned in the remote acquisition vehicle operates a wide field-of-view and low-bandwidth tracking system schematically illustrated at 96 to acquire the coordinates of a potential target 98 (FIG. 3B) present in its field of view. After target acquisition, the operator 94 of the remote acquisition vehicle hands-over a course acquisition signal to the course controller 46 (FIG. 2). The controller 46 locks onto the coordinates of the target 98, and so moves the system 48 (FIG. 2) as to place an optical image of the target 98 within the field-of-view of the system 54 via the optics 88, 86, 62, 84, and 92 on the imaging sensor 90, as generally shown at 100 in FIG. 5.

An operator 102 (FIG. 3B) views the image 100 (FIG. 5) on the sensor 90 in real-time, and actuates by any suitable means the laser 64. The laser 64 preferably provides a low-power alignment and designator beam that passes through a beam splitter 104 to be described and through the lens 66, beam splitters 92, 70, lens 84, spinning mirror 62, pointing mirror 86, and through expander 88 onto the target 98 as illustrated by rays designated at 106. The imaging sensor 90 over the same but reciprocal optical path of the rays 106 provides a visual image thereof in real-time as schematically illustrated at 107 in FIG. 5. The operator may then move a cursor 108 (FIG. 5) on the imaging sensor 90 (FIG. 3B), to a position illustrated dashed at 110 for example, to provide an intended aimpoint. The beam splitter 104 moves in response to the movement of the cursor via a control circuit 91 and actuator, not shown, and therewith the designator beam is shifted on the target to the intended aimpoint. Although a cursor-controlled beam splitter for changing the intended aimpoint reference is preferred, it will be appreciated that any other designator spot position control means for operator aimpoint selection can be employed as well without departing from the inventive concept.

An image of the designator spot is also returned through the elements 88, 86, 62, 84, and 70 onto the alignment sensor 68 as schematically illustrated by a spot 112 in FIG. 6.

The output of the laser 64 as shown by rays 114 traverses a first optical path through the lens 66, splitters 92, 70, lens 84, and splitter 76, and is deviated off the spinning mirror 62 onto the convex reflector 60. The alignment laser beam is reflected off the reflector 60 back therefrom onto the spinning mirror 62 and through the lens 72, splitter 76, lens 84 and off the beam splitter 70 onto the alignment sensor 68 producing spot representative of the pointing direction of the cavity reflector 60 as schematically shown by a spot 116 in FIG. 6. The alignment laser as shown by the rays 114 is split off the splitter 76 producing a second beam which is deviated off the mirrors 78, 80, 82 through the lens 74 and is deviated off the other specular surface of the spinning mirror 62 onto the main concave cavity mirror 58. The light is reflected thereoff back to the spinning mirror 62 and back through the lens 74 and mirrors 82, 80, and 78 and deviated off the beam splitter 76 through the lens 84 onto the beam splitter 70. The beam splitter 70 deviates the beam onto the alignment sensor 68 producing an image representative of the pointing direction of the reflector 58 as shown by a spot 118 (FIG. 6) on the alignment sensor 68. A controller 120 is responsive to the centroids of the sensor plane images 112, 116, 118 relative to optical null to provide an x, y tilt control signal to an x, y actuator 122 mounted to the convex reflector 60 to automatically align the pointing direction of the cavity 56 with the aimpoint established by or relative to the designator spot. Both cavity boresighting and target designation are thereby substantially simultaneously achieved, and the operator 102 then need only make any fine adjustments in the pointing direction by viewing the region of the sensor target image in the neighborhood of the intended aimpoint. The controller 120 is preferably operative according to the relation $$\sum_{i=1}^{4} \beta_i = 0,$$

where $\beta_1 = \frac{1}{2} \alpha_1$, $\beta_2 = F/f \, \alpha_2$, $\beta_3 = (F-f)/f \, \alpha_3$, and $\beta_4 = \alpha_4$;
where the $\beta_1$ term represents the spacial angle of corrective motion of the cavity convex reflector 60, the $\beta_2$ term that of the cavity concave reflector 58, the $\beta_3$ term that from the designator spot, and the $\beta_4$ term any intended offset between the designated spot and the target aimpoint reference; where $\alpha_1$, $\alpha_2$, and $\alpha_3$ respectively represent the location of the centroids of the spots 116, 118, 112 off optical null of the alignment sensor 68, and $\alpha_4$ represents any offset in the intended aimpoint reference; and where F represents the focal length of the concave reflector, and where f represents the focal length of the convex reflector.

Reference may be had to co-pending U.S. utility patent application Ser. No. 516,468 entitled COMMON OPTICAL APERTURE LASER BORESIGHTER FOR RECIPROCAL PATH OPTICAL SYSTEM, invented by William M. Johnson et al and assigned to the same assignee as the instant invention, incorporated herein by reference, for a further explanation of the cavity alignment process. The system therein shown, described, and claimed includes the main cavity reflector 58 and secondary reflector 60, the spinning mirror 62, and alignment sensor 68 and optics 70, 76, 78, 80, and 82 cooperate to provide the cavity boresight alignment.

Reference may further be had to co-pending U.S. utility patent application filed on even date herewith, Ser. No. 792,014, entitled MOVEMENT AND FOCUS CONTROL SYSTEM FOR A HIGH-ENERGY LASER, invented by Milton B. Trageser and assigned to the same assignee as the instant invention, incorporated herein by reference, for a description of the function of the lenses 72, 74, 84, and 66. The lenses always maintain the collimation of the alignment laser beam and in such a way to image the beam preferably onto a pixel size of the alignment sensor. The therein described and claimed movement and focus control system can with advantage be employed in conjunction with the combination laser designator and boresighter of the present invention to provide focus control of the outgoing beam.

Although any suitable convex cavity feedback mirror 60 may be employed, it is preferred that the cavity mirror disclosed and claimed in co-pending U.S. utility patent application entitled LIMITED DIFFRACTION FEEDBACK LASER SYSTEM HAVING A CONTROLLED DISTORTION CAVITY FEEDBACK MIRROR, filed on even date herewith, Ser. No. 791,912, invented by William M. Johnson and assigned to the same assignee as the instant invention, incorporated herein by reference, be employed. The therein shown and described cavity feedback mirror is operable to maintain its figure undistorted against thermal loading, among other advantages.

Referring now to FIG. 4, generally designated at 124 in FIG. 4A is a schematic view illustrating a course acquisition tracker, and generally designated at 126 in FIG. 3B is a schematic diagram illustrating another embodiment of the combination laser designator and boresighter system for a high-energy laser according to the present invention. The system 124 is the same as the system 52 described above in connection with the description of FIG. 3A. The system 126 is substantially identical with the system 54 described above in connection with the description of FIG. 3B, but differs therefrom primarily in the configuration of the high-energy laser system. In particular, the optical cavity is constituted by a concave primary reflector 58' having a central aperture therethrough, not shown, that is spaced from a convex secondary reflector 60' having a central aperture therethrough, not shown, defining therebetween a master oscillator power amplifier cavity generally designated 128. The convex secondary reflector 60' can with advantage be the same as that described and claimed in the above-identified cognate co-pending application, although any other suitable convex reflector can be employed. An injection laser 130 is coupled to the master oscillator power amplifier cavity 128 through the hole in the concave reflector 58', through which the injection laser light enters the cavity 128 where it undergoes selected amplification. Reference may be had to co-pending U.S. utility patent application entitled LIMITED DIFFRACTION FEEDBACK LASER SYSTEM, filed on even date herewith, Ser. No. 792,128, invented by William M. Johnson and assigned to the same assignee as the instant invention, incorporated herein by reference for a description of an injection laser centering sensor system and relay optics, not illustrated in FIG. 4B, for aligning the injection laser with the optical axis of the cavity 128.

Both embodiments of the present invention are operable to compensate cavity turbulence in real-time. In the FIG. 3B embodiment, the controller is responsive to the image of the convex reflector to provide a high-bandwidth turbulence correction signal for low-bandwidth turbulence, with a "dead time" from the spinning mirror. The convex reflector preferably is centrally provided with a sensor 123 such as a quad cell in the embodiment of FIG. 4B, and the controller 120 is responsive to the centroid of the injection laser on the quad cell to provide a high-bandwidth turbulence control signal even for high bandwidth turbulence. The operation of the FIG. 4 embodiment is otherwise identical with that of the FIG. 3 embodiment, and is not further described for brevity of explication.

In summary, it will be appreciated that the combination high-energy laser designator and boresighter system of the present invention achieves target designation and automatic boresight alignment of a high-energy pulsed laser beam in a manner that avoids turbulence and other atmospheric-induced uncertainties due to the phenomena of propogation reciprocity and that provides both highly accurate target aimpoint and energy delivery to target with a very fast system response time.

Many modifications of the presently disclosed invention will become apparent to those skilled in the art without departing from the scope of the appended claims.

What is claimed is:

1. Laser apparatus for designating and boresighting a target, comprising:
    a comparatively high-energy laser system having first and second cavity mirrors;
    an alignment sensor;
    an imaging sensor;
    a comparatively low-energy alignment laser;
    first optical means for directing said comparatively low-energy laser along first and second optical paths that respectively include said first and second cavity mirrors and said alignment sensor to provide images respectively representative of the pointing direction of said first and second cavity mirrors on said alignment sensor;
    second optical means cooperative with said first means and partially inclusive of said first means for directing said comparatively low-energy laser along a third optical path that includes said target to provide an intended aimpoint designator spot thereon; and
    third optical means cooperative with said second means and partially inclusive of said first and second means for directing optical energy present along a fourth optical path reciprocal to said third optical path and that includes said imaging sensor to provide an optical image of said target and an optical image of said intended aimpoint designator spot on said imaging sensor.

2. The laser apparatus of claim 1, wherein said first and second cavity mirrors respectively are convex and concave reflectors defining a confocal unstable laser resonator cavity.

3. The laser apparatus of claim 1, wherein one of said cavity mirrors is a concave reflector and wherein the other one of said cavity mirrors is a convex reflector defining therebetween a master oscillator power amplifier cavity, further including an injection laser, and further including means for coupling said injection laser to said master oscillator power amplifier cavity.

4. The laser apparatus of claim 1, wherein said first means includes a spinning disk having faces respectively defining specular surfaces that is positioned in said cavity with one of said specular surfaces confronting said first cavity mirror and with the other of said specular surfaces confronting said second cavity mirror.

5. The laser apparatus of claim 4, wherein said second means includes first optics confronting one of said specular surfaces of said spinning disk for deviating the comparatively low-energy laser along said third optical path onto said target.

6. The laser apparatus of claim 5, wherein said third means includes second optics confronting said one of said specular surfaces of said spinning disk for deviating return energy present along said fourth optical path reciprocal to said third optical path onto said imaging sensor.

7. The laser apparatus of claim 1, wherein said imaging sensor is a mosaic array.

8. The laser apparatus of claim 1, wherein said alignment sensor is a mosaic array.

9. The laser apparatus of claim 1, further including a x, y tilt actuator mounted to one of said first and said second cavity mirrors.

10. The laser apparatus of claim 1, further including means cooperative with said second means for changing the location of said aimpoint designator spot on said target.

* * * * *